United States Patent

Anacker

[15] 3,646,550

[45] Feb. 29, 1972

[54] MAGNETIC DECODER NETWORK WITH MULTIDIMENSIONAL SELECTION CAPABILITY

[72] Inventor: Wilhelm Anacker, Yorktown Heights, N.Y.

[73] Assignee: International Business Machines Corporation, Armonk, N.Y.

[22] Filed: Dec. 24, 1969

[21] Appl. No.: 887,870

[52] U.S. Cl. ....................................340/347 DD, 340/166 C

[51] Int. Cl. ..........................................................H04l 3/00

[58] Field of Search ..................340/347 DD, 174 BC, 174 M

[56] References Cited

UNITED STATES PATENTS

| | | | |
|---|---|---|---|
| 3,278,915 | 10/1966 | Joseph | 340/174 PC |
| 3,222,669 | 12/1965 | Lee | 340/347 DD |
| 3,229,262 | 1/1966 | Quartly | 340/174 PC |
| 3,141,158 | 7/1964 | Minnick et al. | 340/347 DD |
| 2,768,367 | 10/1956 | Rajchman | 340/174 PC |
| 3,192,520 | 6/1965 | Marette et al | 340/347 DD |

*Primary Examiner*—Maynard R. Wilbur
*Assistant Examiner*—Jeremiah Glassman
*Attorney*—Hanifin and Jancin

[57] ABSTRACT

A decoding network with two- or three-dimensional selection capability is composed of magnetic switch elements such as toroidal cores, toroidal films or other films operated in the parallel-field switching mode. Each switch element has a response-excitation characteristic that enables the element to remain in a normal stable state unless it is subjected to an excitation in excess of a given threshold level, whereupon it switches to a different state, at least for the duration of the applied excitation. A coincidence of excitations applied in several selection coordinates may be required to condition an entire set or column of such elements for switching. The elements in each conditioned set or column are selectively switched in response to binary or other bivalued input signals applied to input lines which are individual to the respective elements of any one set but shared by corresponding elements of other sets, the selection of these input signal values constituting still another dimension or coordinate of selection. The input lines are paired so that one selected line of each pair is energized by an input signal of a given binary value. Thus, half of the elements in a set are switched for any given combination of input values. Furthermore, the number of elements switched is always even. A plurality of output lines is associated with each set of elements in such fashion that a unique output line is energized for each different combination of input signal values, with all of the switched elements in the set additively contributing portions of the output signal on that line; whereas in all of the other output lines of that set, the component signals contributed by the switched elements cancel each other out. If toroidal switch elements are used, they are arranged in relatively shiftable planes to facilitate threading the output lines through the switch elements in the desired individual wiring configurations.

9 Claims, 20 Drawing Figures

INVENTOR
WILHELM ANACKER

BY John D. Crane
AGENT

FIG. 2e
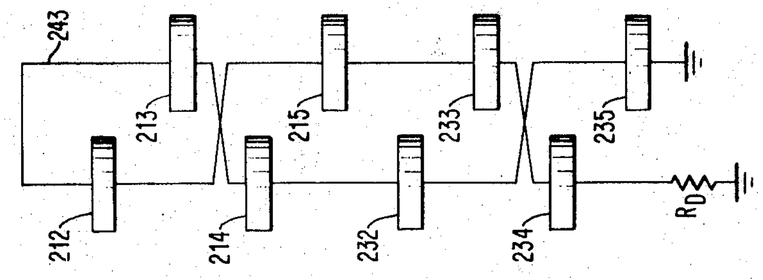
FIG. 2d
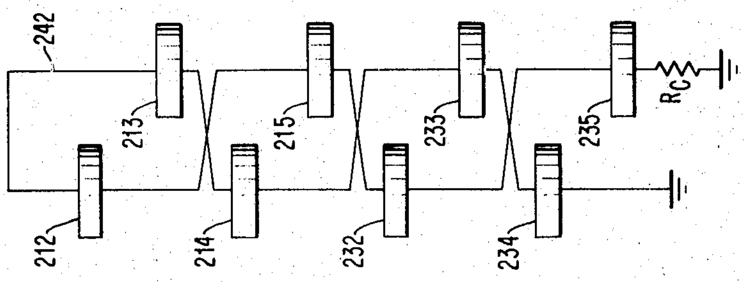
FIG. 2c
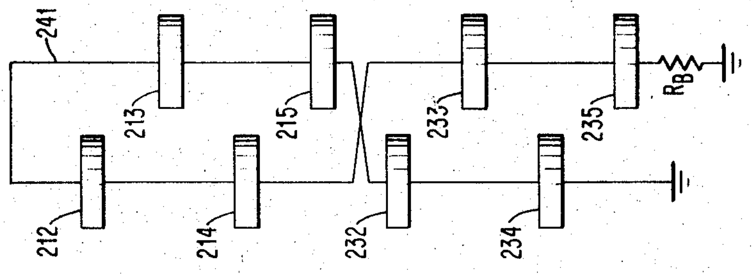
FIG. 2b
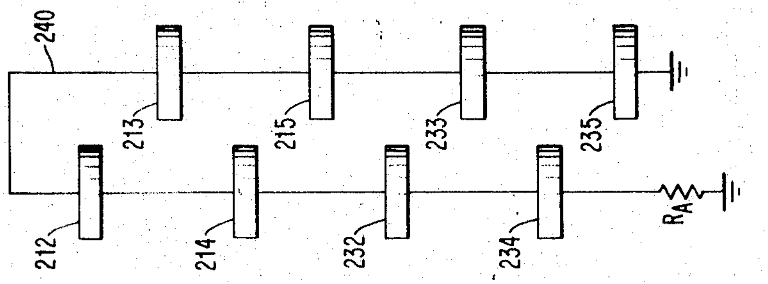
FIG. 2a
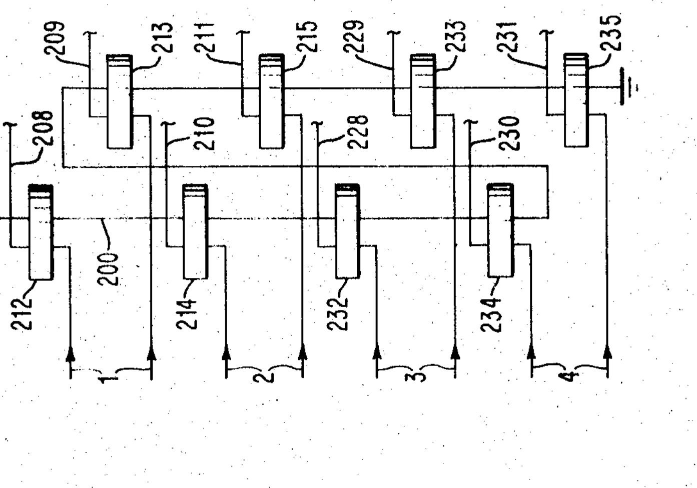
FIG. 2f
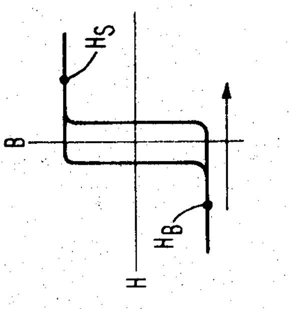
FIG. 2g
| INPUT PAIRS | | | | OUTPUTS | | | |
|---|---|---|---|---|---|---|---|
| 1 | 2 | 3 | 4 | 240 | 241 | 242 | 243 |
| 208 | 210 | 228 | 230 | 4 | 0 | 0 | 0 |
| 208 | 210 | 229 | 231 | 0 | 4 | 0 | 0 |
| 208 | 211 | 228 | 231 | 0 | 0 | 4 | 0 |
| 208 | 211 | 229 | 230 | 0 | 0 | 0 | 4 |

FIG. 3
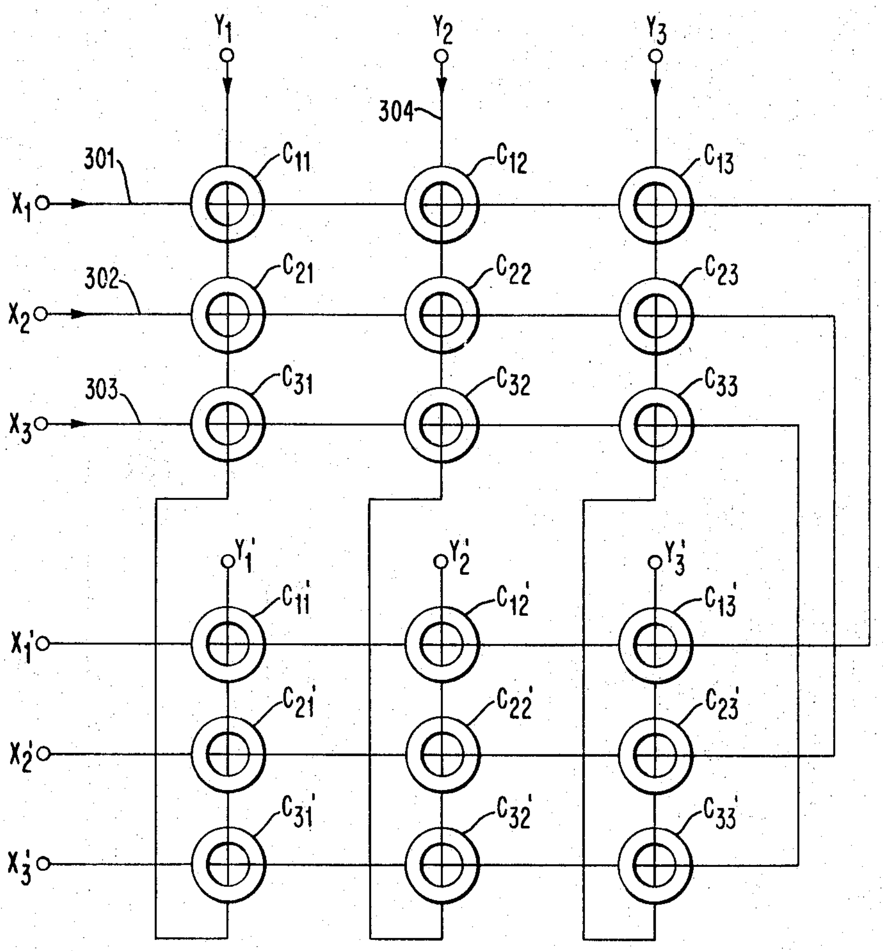
FIG. 4a
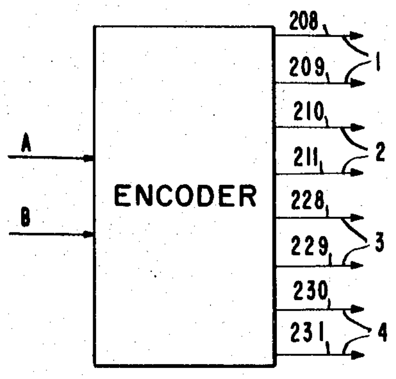
FIG. 4b
| INPUTS | | INPUT LINES ACTIVATED | | | |
|---|---|---|---|---|---|
| A | B | 1 | 2 | 3 | 4 |
| 0 | 0 | 208 | 210 | 208 | 230 |
| 0 | 1 | 208 | 210 | 229 | 231 |
| 1 | 0 | 208 | 211 | 228 | 231 |
| 1 | 1 | 208 | 211 | 229 | 230 |

FIG. 5a
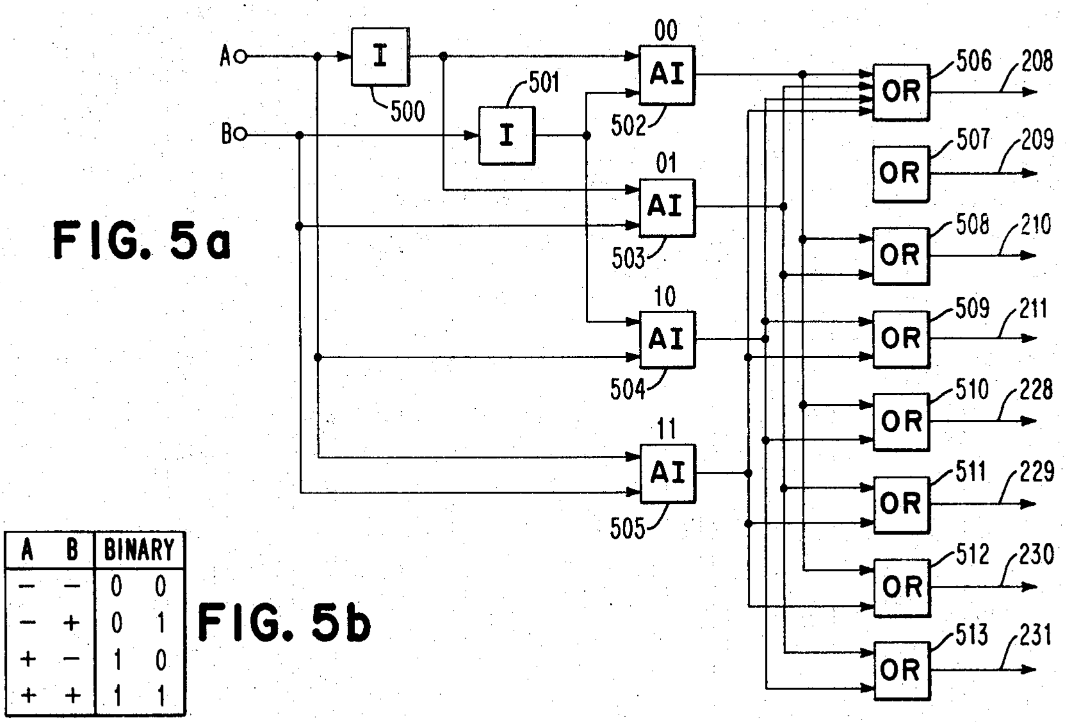
| A | B | BINARY |
|---|---|---|
| − | − | 0 0 |
| − | + | 0 1 |
| + | − | 1 0 |
| + | + | 1 1 |
FIG. 5b
FIG. 6
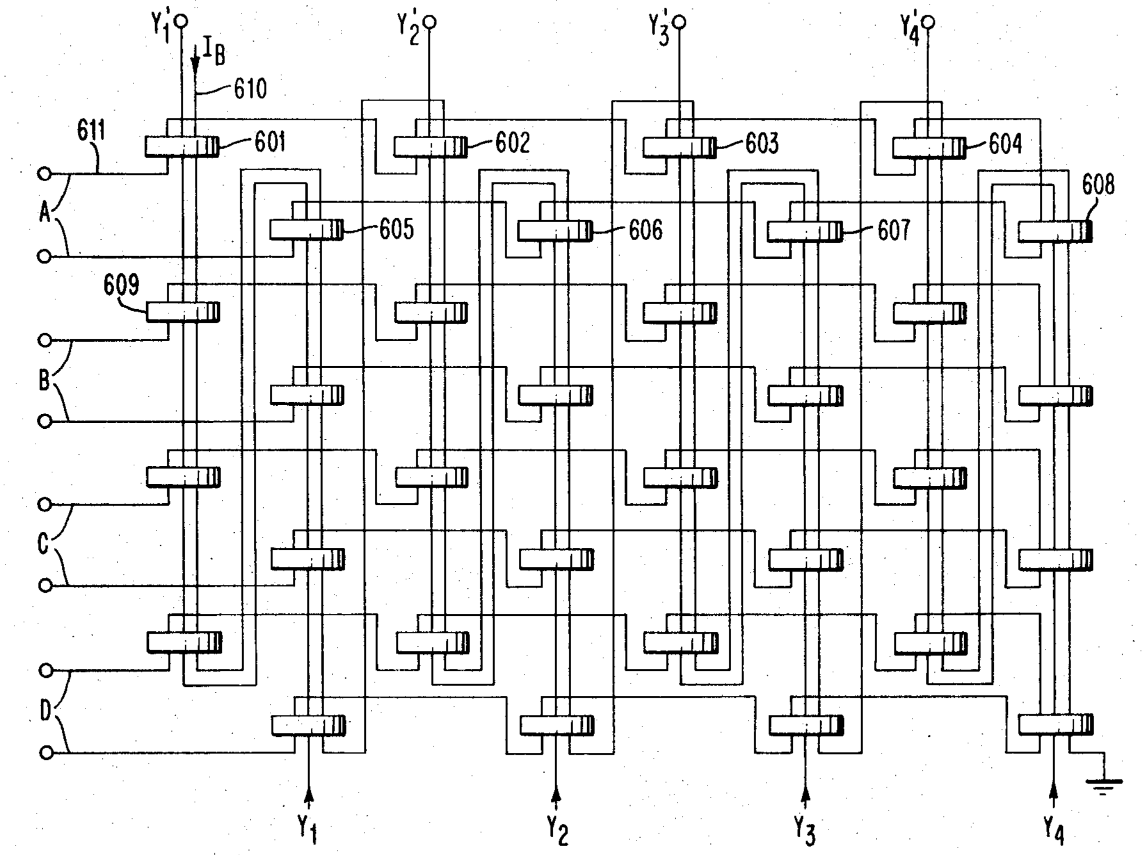

MAGNETIC DECODER NETWORK WITH MULTIDIMENSIONAL SELECTION CAPABILITY

BACKGROUND OF THE INVENTION

This invention relates to switching devices employing particularly magnetic switching techniques.

In the field of digital computation it is a common problem to decode large binary numbers so as to activate a single output line. This is particularly the problem in addressing of large size random access storage devices, such as magnetic element memories. In the past, many kinds of decoding devices have been employed so as to activate the magnetic elements associated with a desired word within a large scale magnetic memory device. These devices typically include electronic decoding networks involving large numbers of logical elements and the necessary electrical connections. One of the problems of such devices, however, is that the reliability of the memory is affected by the reliability of the addressing circuitry since failures have been shown to occur more frequently in the electronic circuitry than in the magnetic elements within a large scale random access memory.

In order to overcome the problem of reliability, techniques of minimizing the electrical circuitry have been employed. However, a second possible approach is to take advantage of the inherent reliability of magnetic switching devices in a decoder so as to produce a network having a higher reliability than previous electronic decoding devices.

Magnetic switching devices have been employed in the past and particularly, the approach of L. A. Russell in U.S. Pat. No. 3,371,218 is of interest. The device shown by Russell employs transformers with a plurality of secondaries wound around each transformer core. Any signal containing voltage pulses entering the primary of any transformer in the Russell network causes a corresponding output signal in all secondary windings. Thus, noise signals on the primary are passed through to the secondary windings creating the possibility of spurious signals and decodings. A second major disadvantage to this approach is the nonadaptability to matrix decoding. Since Russell uses transformers, half-select signals on the primaries will cause signals to appear at the secondaries.

It is an object of this invention to provide a switching device for use in multidimensional matrix decoders.

It is an object of this invention to provide a magnetic switching device which is less susceptible to noise and other minor disturbances on input lines than prior art magnetic switching devices.

It is an object of this invention to provide a magnetic switching device capable of being fabricated by high speed manufacturing techniques at relatively low cost.

It is an object to provide a decoder which can be fabricated along with a memory device which uses the decoded signals. Such a configuration reduces the complexity of interconnecting the decoder with the memory.

It is a further object of this invention to provide decoding devices which take advantage of the inherent reliability of magnetic switching.

BRIEF DESCRIPTION OF THE INVENTION

In order to achieve the above-identified objectives, the present magnetic switching device employs magnetic elements of the type commonly found within magnetic core storage devices such as toroidal cores, toroidal films or other films operated in the parallel-field switching mode. The magnetic elements are wired such that a bias current passes through all of the magnetic elements within the switching device so as to bias each element to a stable point on its B-H characteristic curve. The elements are then wired in such a manner that for every combination of control signals, an even number of elements are switched from the steady state to another state on the B-H characteristic curve while the control signals are applied. Appropriate output wiring is employed such that a unique combination of input signals causes a unique combination of magnetic elements to switch which in turn is sensed by a single selected output line out of a plurality of such lines. Since a plurality of cores are switched, a complementary voltage contribution on the selected output line occurs for each element that switches. The remaining output lines passing through the elements which are switched are wired in such a way that the voltage contributions cancel each other, resulting in a net output voltage on each of the other output lines of 0.

The foregoing and other objects, features and advantages of the invention will be apparent from the following more particular description of the preferred embodiments of the invention as illustrated by the accompanying drawings.

IN THE DRAWINGS

FIGS. **1*a*, 1*b*, 1*c*, and 1*d*** show various wiring and driving techniques for producing a magnetic switch characterized by this invention.

FIGS. **2*a*, 2*b*, 2*c*, 2*d* and 2*e*** relate to a particular example of selection line wiring and show particular sense line wirings of the type characterized by the present invention.

FIG. **2*f*** shows a typical B-H characteristic curve.

FIG. **2*g* shows a table explaining the operat:›n of the elements of FIGS. 2*a*, 2*b*, 2*c*, 2*d* and 2*e***.

FIG. 3 shows the wiring of a few typical magnetic elements in the decoding configuration.

FIG. **4*a*** relates to an electronic encoding device required to activate the magnetic switches.

FIG. **4*b* shows the desired operation of the electronic encoder of FIG. 4*a***.

FIG. **5*a* shows one possible logical encoding network of the type shown in FIG. 4**.

FIG. **5*b* shows the binary equivalents for typical input voltages to the encoder of FIG. 5*a***.

FIG. 6 shows diagrammatically a two-dimensional cross section of the magnetic decoding network typified by this invention.

FIGS. **7*a* and 7*b*** show two steps in the manufacturing process for making the magnetic switch of the present invention.

FIG. 8 shows another preferred embodiment of the present invention employing magnetic film spots deposited upon a substrate.

DETAILED DESCRIPTION

Figure 1A:
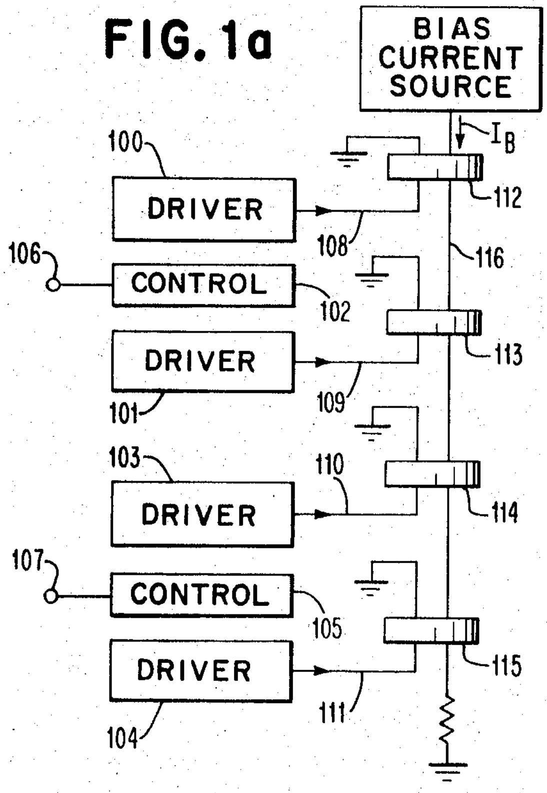

FIGS. **1*a*, 1*b*, 1*c* and 1*d* show several embodiments of possible wirings for magnetic switches characterized by this invention. Particularly, FIG. 1*a* shows a magnetic switching device employing magnetic elements 112, 113, 114 and 115. These elements have a biasing wire 116 passing therethrough with a bias current $I_B$ in the direction as shown. Referring briefly now to FIG. 2*f*, it should be noted that the magnetic characteristics of magnetic elements is generally of the type exemplified by the B-H characteristic curve shown there. The biasing current passing through the magnetic elements 112, 113, 114 and 115** is presumed to bias the magnetic elements so as to be in a position typified by the point $H_B$, a stable point on the B-H characteristic curve.

If a current is driven in selection line 108 shown in FIG. **1*a* in the direction of the arrow there shown and of a magnitude large enough to cause the magnetic element to switch its magnetization vector, the element will switch to a point on the characteristic curve of FIG. 2*f* typified by the point labeled $H_s$. Removal of the current will cause the magnetic element to return to the biased stable position typified by the point $H_B$. Thus, a current in any one of the selection lines 108, 109, 110 and 111 of a sufficient magnitude can cause any one of the magnetic elements 112, 113, 114 and 115** to switch and thus cause an output to be sensed on a sense line passing therethrough.

In order to generate the desired current drive, each of the selection lines has an associated driver to cause a current to flow in the selection line of a sufficient magnitude to cause a magnetic element threaded thereon to switch. Current drivers 100, 101, 103 and 104 are respectively associated with selection lines 108, 109, 110 and 111. Each of the drivers is activated by a signal from an associated control circuit. Control circuit 102 is capable of activating either current driver 100 or current driver 101 in response to a signal received at input 106. Input 106 is typically a bivalued signal having, for example, a positive and negative state. Upon recognition of one of the input states, control circuit 102 activates either current driver 100 or current driver 101. Assuming that control 102 activates current driver 100 upon receipt of a first binary state at input 106, control circuit 102 would activate current driver 101 upon receipt of a signal of the second binary state at input 106. Thus, a signal of one binary state at input 106 will cause either magnetic element 112 or magnetic element 113 to switch depending upon the binary state of the input signal. Therefore, for each input control signal there is said to be an associated pair of magnetic elements which are switched in accordance with the binary state of the input control signal. A second associated pair of elements is shown in FIG. 1*a*, namely, magnetic elements 114 and 115. These elements are switched by selection lines 110 and 111 respectively. The necessary control to generate the driving currents in these selection lines is generated by current drivers 103 and 104 under the direction of control 105 which receives control signals at input 107.

Figure 1B:
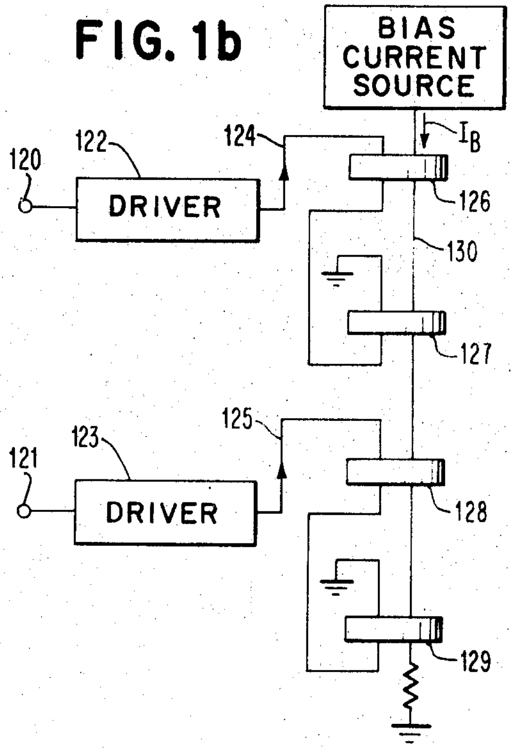

Referring now to FIG. 1*b*, a different scheme for wiring the associated pairs of magnetic elements is shown as well as a requirement for a different type of driver circuit. Specifically, magnetic elements 126, 127, 128 and 129 are threaded by bias line 130 having a bias current $I_B$ passing therethrough in the direction shown. Since it is desired to only switch one of the associated pair of magnetic elements upon receipt of a single binary state of a control signal, the selection line 124 passes through magnetic elements 126 and 127 in different directions relative to the direction of the bias current. Thus, a current flowing in selection line 124 in the direction of the arrow would pass through magnetic element 126 in the same direction of the bias current. Thus, magnetic element 126 would not switch. The current in selection line 124, however, passes through magnetic element 127 in a direction opposite to that of the bias current and thus if the current in selection line 124 is large enough, magnetic element 127 will switch. Current driver 122 is connected to selection line 124 and is capable of driving current in selection line 124 in either of two possible directions, causing either magnetic element 126 or magnetic element 127 to switch depending upon the direction of current imparted in selection line 124. Current driver 122 acts in response to control signals having two binary states and presented to the current driver at input 120. For an input terminal 120 of one binary state, current driver 122 would drive a current in selection line 124 in the direction of the arrow. For a control signal of the other binary state, current driver 122 would cause a current to flow in selection line 124 in a direction opposite to that of the arrow. Thus, the current driver 122 is of the bidirectional type and is capable of switching either magnetic element 126 or 127, depending upon the state of the input at input terminal 120.

A second associated pair of magnetic elements is shown in FIG. 1*b*, namely, magnetic elements 128 and 129. This associated pair of elements has a selection line 125 passing through each of the elements in the associated pair of elements in opposite directions relative to the direction in which the bias current passes therethrough. Selection line 125 is connected to current driver 123 which responds to input control signals at input terminal 121. The operation of the second pair of associated elements (magnetic elements 128 and 129) is the same as for the operation of the first associated pair of magnetic elements (magnetic elements 126 and 127).

Figure 1C:
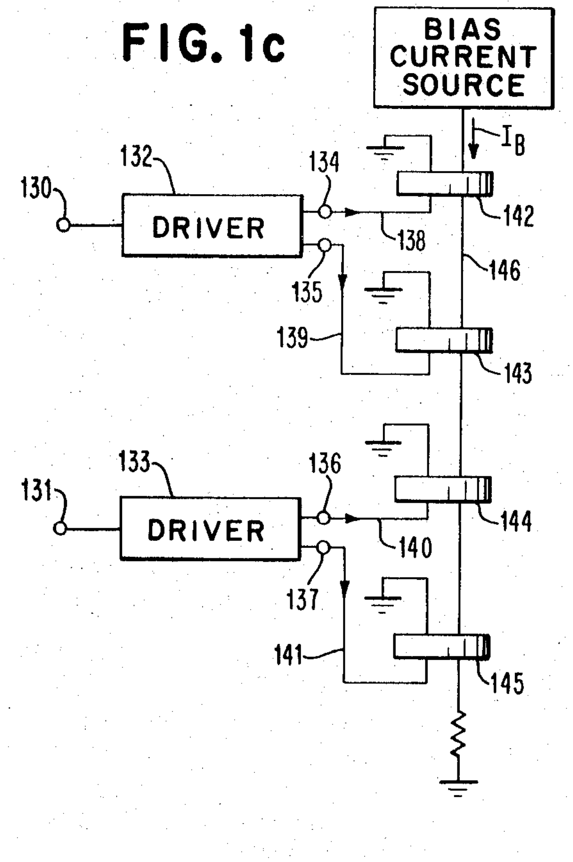

Referring now to FIG. 1*c*, two associated pairs of magnetic elements are also shown with associated driving circuitry capable of switching one of the associated pair of magnetic elements. Specifically, magnetic elements 142, 143, 144 and 145 are threaded with a biasing wire 146 in which a bias current $I_B$ is flowing and in the direction as shown. Each of the magnetic elements has a selection line passing therethrough in a direction opposite to that of the biasing current. For example, magnetic elements 142 has selection line 138 passing through it. Selection line 138 is connected to output node 134 of driver 132. A similar relationship exists between output node 135, selection line 139, and magnetic element 143. Driver 132 is capable of driving current out of output node 134 or 135, but not both simultaneously. Driver 132 responds to binary inputs at input terminal 130 so as to drive current either out of output node 134 or 135. Driver 132, for example, would respond to one input state at input terminal 130 so as to drive a current out of output node 134 and down selection line 138 in the direction of the arrow. At the same time that a current is flowing in selection line 138, no current is flowing in selection line 139. Assuming the magnitude of the current flowing in selection line 138 is sufficient to switch element 142, a selection line, later to be described, passing through element 142 will sense a voltage due to the switching of element 142, but will sense no voltage from passing through element 143 as that element is not switched.

A second associated pair of magnetic elements, magnetic elements 144 and 145, are shown having selection wires 140 and 141 passing therethrough, respectively, in a direction opposite to that of the biasing current. An associated driver 133 is capable of driving current out of output nodes 136 or 137 in such a direction to pass through the associated magnetic core in a direction opposite to the biasing current. Thus, driver 133 in response to control signals presented at input terminal 131 can switch either magnetic core 144 or 145 depending upon the state of the input control signal.

Figure 1D:
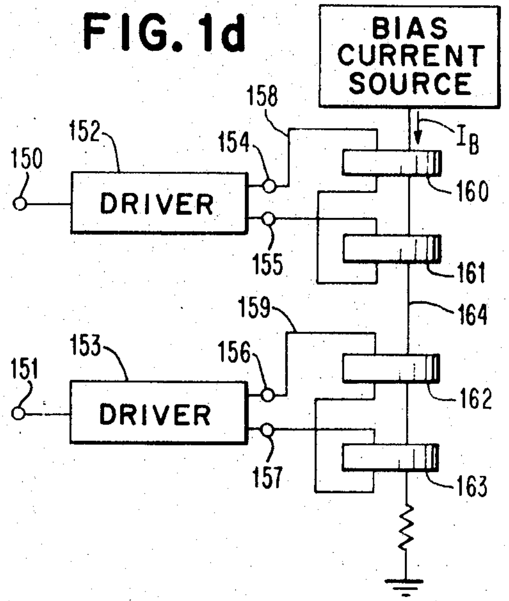

FIG. 1*d* shows another configuration of drivers and selection lines characterizing the present invention. Drivers 152 and 153 are capable of driving currents out of output nodes 154, 155, 156 and 157 in response to input control signals at input terminals 150 and 151. The principal difference that should be noted in this particular embodiment of the invention is that the selection line passing through an associated pair of cores is connected to one output node of the driver and returned to the other output node of the same driver. Specifically, for driver 152, selection line 158 is connected to output node 154. Selection line 158 then passes through magnetic element 160 in one direction relative to the bias current and then passes through magnetic element 161 in the other direction relative to the biasing current, the other end of selection line 158 being terminated at output node 155. Thus, driver means 152 can drive a current out of output node 154 and cause one of the associated pair of magnetic elements to switch. A current flowing out of output node 155 will cause the other of the associated pair of magnetic elements to switch. In fact, it will be recognized that driver 152 acts so as to drive current out of one node and into the other in response to an input control signal.

A second associated pair of magnetic elements is also shown in FIG. 1*d*. Input control signals having two states are presented to input terminal 151 which then directs driver 153 to cause current to flow either into or out of output node 156 while current must flow out of or into node 157 simultaneously. Selection line 159 has each end terminated on a unique output node and passes through magnetic elements 162 and 163 in opposite directions relative to the biasing current.

Thus, it will be recognized by those of skill in the art that the various approaches shown in FIGS. 1*a*, 1*b*, 1*c*, and 1*d* are merely exemplary and that other possible driving schemes may be devised. In essence, this invention requires a driving means capable of switching one or the other of an associated pair of magnetic elements in response to a bilevel control signal.

To use the switching characteristics of the magnetic elements as has already been described, it is necessary to combine the switching of several magnetic elements and the sensing of unique output lines to produce an output on a single output line. In order to understand this operation, attention is directed to FIG. 2*a*. FIG. 2*a* shows a plurality of magnetic elements being threaded with various selection lines and a bias line. Bias line 200 has a current flowing in it in the direction of the arrow generated by voltage source $V_B$. The bias current is capable of causing each of the magnetic elements threaded on the bias wire 200 to be biased to a point exemplified by point $H_B$ shown in FIG. 2*f*.

The purpose of the bias current is to ensure that the magnetization vector of each of the magnetic elements is in a predetermined state whenever the decoder is activated. This is most easily achieved by a bias line and a current passing therethrough. However, it would be possible for magnetic elements having rectangular, hysteresis characteristics to replace the fixed bias current source with a pulsed source. That is, after each operation of the decoder, the bias current source would be activated to restore any switched magnetic element to a predetermined state with a known magnetization vector direction. Any other means for restoring the magnetization vector to a known state is also an acceptable substitute for the shown bias wire 200 and its associated bias current $I_B$.

For magnetic elements not having a rectangular hysteresis characteristic, a fixed bias is required to maintain the magnetization vector in a predetermined direction. The switching is accomplished by applying an excitation of a sufficient magnitude to overcome the effect of the bias and cause the magnetization vector to switch.

Before each operation of the decoder, the magnetization vector for each magnetic element must be known. If this were not true, the activation of an input selection line might not cause a change of the magnetization vector in an associated magnetic element. Thus there would be no switching to cause an induced voltage at the output.

Another reason for having bias applied to each magnetic element is to prevent undesired switching caused by noise signals. When a bias signal is applied, a relatively large signal in the opposite direction to the bias is required to switch a biased magnetic element. The signal is said to have a threshold value which must be exceeded in order to switch the biased magnetic element. The threshold value can be selected by adjusting the bias so that noise signals do not exceed the threshold.

Where magnetic elements having rectangular hysteresis characteristics are used and where noise signals are unable to switch the magnetic elements when no bias is applied, a bivalued signal may be employed on input selection lines. The first pulse on the line will switch the magnetic element from one stable point on the hysteresis characteristic curve to another. A second pulse of the opposite polarity to the first pulse is used to return the magnetic element to the first mentioned stable point on the hysteresis characteristic curve.

Magnetic elements 212, 213, 214, 215, 232, 233, 234 and 235 are all threaded on bias wire 200 and have a bias current passing therethrough. Each of the above-mentioned magnetic elements have an associated selection line passing therethrough, namely selection lines 208, 209, 210, 211, 228, 229, 230 and 231. The associated driver for each of the selection lines is not shown, although the driver connections as shown in FIGS. 1*a* or 1*c* could be employed provided that the current from each of the output nodes of the driver is in the direction shown for each of the selection lines. Other selection lines could be employed as shown in FIGS. 1*b* and 1*d*.

Selection lines 208 and 209 pass through a first associated pair of magnetic elements, namely 212 and 213. A second associated pair of magnetic elements are magnetic elements 214 and 215, while the third associated pair are magnetic elements 232 and 233, and a fourth associated pair are magnetic elements 234 and 235. The previous driving relationships mentioned with regard to FIGS. 1*a*, 1*b*, 1*c* and 1*d* must exist for the associated pairs shown in FIG. 2*a*, namely that only one magnetic element of an associated pair can switch at any one time. This means that of selection lines 208 and 209, for example, only one can have a current flowing in it at a given time. The same relationship must exist for pairs of selection lines 210 and 211, 228 and 229, and the pair 230 and 231.

Referring now to the table shown FIG. 2*g*, the left half of the table shows four rows of numbers, each row of numbers is representative of a unique combination of activated selection lines responding to input control signals. For example, the top row shows that lines 208, 210, 228 and 230 are active in having current flowing in the direction of the arrows shown in FIG. 2*a*. The other three rows show a different combination of possible activated selection lines. It should be noted at this time that input line 209 is never activated and as a consequence in the particular embodiment shown, magnetic element 213 never switches and therefore is unnecessary. Likewise, selection line 209 is also unnecessary. However, it is sometimes advantageous to have physically in the system magnetic elements such as 213 even though they are never actually used in the switching scheme because of manufacturing convenience.

Assuming for the moment that selection lines 208, 210, 228 and 230 are active and have a current flowing in the direction of the arrows as shown in FIG. 2*a*, it is clear that magnetic elements 212, 214, 232 and 234 must switch from the stable state labeled $H_B$ in FIG. 2*f* to the state labeled $H_s$. The changing of the magnetic state of the magnetic element will then cause and induce voltage in output lines passing through each of these switched elements.

Referring now to FIG. 2*b*, output line 240 is drawn in a very particular way so as to pass through all of the magnetic elements. FIG. 2*b* shows the same magnetic elements as shown in FIG. 2*a* without the bias line 200 and the various selection lines shown. In FIG. 2*b*, output line 240 passes through magnetic elements 212, 214, 232 and 234 in the same direction. When magnetic element 212 switches, an induced voltage will occur in output line 240 in the relative polarity as shown next to magnetic element 212. A similar induced voltage will also occur when magnetic elements 214, 232 and 234 switch. Assuming that all four magnetic elements switch simultaneously, there will be a voltage contribution due to the switching of each magnetic element which will sum and net a voltage across resistor $R_A$. This is represented in FIG. 2*g* in the column labeled 240 in row 1 where there appears the number 4. The 4 stands for the summing of voltage contribution from each of the four switched magnetic elements.

Referring now to FIG. 2*c*, a second sense line 241 is shown passing through the same magnetic elements as shown in FIG. 2*a* although the selection line, the bias line and other sense lines are not shown. Sense line 241 passes through the various magnetic elements in a different way from that of sense line 240. Since the wiring configuration is different, the voltage contribution from each of the switching magnetic elements when input selection lines 208, 210, 228 and 230 are activated cancel each other out, resulting in a 0 voltage across load resistor $R_B$. Thus, for the input combination shown on the first row of Table 1, no output voltage is sensed by sense line 241. This is represented on the right side of FIG. 2*g* by a zero in the column labeled 241 and in row 1.

A similar relationship exists for sense line 242 in FIG. 2*d* and sense line 243 in FIG. 2*e*. Each of these sense lines is wired differently from any of the other mentioned sense lines causing the voltage contributions of the switching elements under the above-mentioned input combination to cancel each other out and thus cause a 0 voltage to occur across the load resistors $R_C$ and $R_D$.

By changing the active input selection lines to a different combination, it is possible to cause different magnetic elements to switch. For example, using the input combination shown on the second row of FIG. 2*q*, magnetic elements 212, 214, 233 and 235 can be caused to switch. The activation of these magnetic elements will cause voltage contributions to add up such that a voltage will occur across resistor $R_B$ shown in FIG. 2*c* while no voltage will occur across any of the other above-identified load resistors.

It will be clear, from the above discussion, that by selecting unique combinations of input signals to be driven down corresponding selection lines in combination with unique wiring of output lines, it is possible to switch several magnetic elements in each switching element while causing only one of the uniquely wired output lines to have voltage contributions caused by switching magnetic elements to add up rather than cancel out.

It should be noted at this time that the output sensing lines are substantially unaffected by noise and other minor disturbances (such as half-select currents) on the input selection line simply because a relatively large signal is required to cause the magnetic elements to switch. Since the half-select and/or noise signals are generally of a small magnitude, none of the magnetic elements would switch in response thereto and, thus, the input is isolated from the output lines. This isolation is caused by the fact that the magnetic elements are biased or reset to a fixed point on their nonlinear B-H characteristic curve and a relatively large signal is required to overcome the nonlinearity of the magnetic element.

Referring now to FIG. 4*a*, a schematic is shown for an encoder which is capable of activating the control signals in response to two input signals, "A" and "B" previously used to designate outputs. Inputs A and B are shown in the table of FIG. 4*b* to have binary states and the encoding network of FIG. 4*a* responds to the various binary states so as to activate the lines shown for the various input pairs.

Referring now to FIG. 5*a*, an electronic logic embodiment for the encoder shown in FIG. 4*a* is drawn. This particular embodiment is merely exemplary of many possible embodiments and uses a particular form of logic as will be described. Relative input voltages at input terminals A and B is shown in the table of FIG. 5*b* on the left side, while the right side represents the binary equivalent which corresponds to that shown in FIG. 4*b*. The encoding network has two inverters, 500 and 501. These inverters will take the polarity of the input signal and invert it. The encoding network also has four AND invert blocks 502, 503, 504 and 505. The AND invert blocks act such that if both input lines are of a positive polarity, the output line is always negative. Any other input combination yields a positive output. The encoding network further has a plurality of OR circuits 506, 507, 508, 509, 510, 511, 512, and 513. The OR circuits as shown are active such that if any one input to the OR circuit is negative, the output will always have a positive polarity. Thus, with a positive output polarity from any one OR circuit, a current can be driven in the respective lines in the proper direction to cause the desired switching of magnetic elements. The interconnection as shown in FIG. 5*a* will cause the proper currents to flow in selection lines 208, 209, 210, 211, 228, 229, 230 and 231, so as to activate the sense lines shown in FIGS. 2*b*–2*e*. It will be recognized, by those of skill in the art, that other possible configurations of encoding are available to accomplish the desired encoding of two binary input lines so as to always switch one magnetic element of an associated pair of magnetic elements in the magnetic switching device. It should be noted further that no connections are shown for the input to OR 507 because in the embodiment discussed, selection line 209 is not activated. For manufacturing purposes it may be desirable to include such a circuit because a studied part could be used with different selection line combinations then shown.

Referring now to FIG. 3, a plurality of magnetic elements is shown with various selection wires passing therethrough. Every magnetic element is identified by the label of the form $C_{XY}$, where X and Y are numbers representing the X row and the Y row in which the element occurs. For example, magnetic element $C_{12}$ occurs in the first X row and in the second Y row. Selection wire 301 is shown and is drawn between input terminal $X_1$ and $X'_1$. Selection line 301 passes through six magnetic elements, namely $C_{11}$, $C_{12}$, $C_{13}$, $C'_{13}$, $C'_{12}$ and $C'_{11}$. A driver of the type described in relation to FIG. 1*d* could be used to attach across the terminals $X_1$ and $X'_1$. Likewise, if the driver associated with these terminals has only a driving capability so as to "half select" a magnetic element, a current flowing in line 301 will cause none of the magnetic elements wired thereon to switch. A second current is necessary to switch such an element. A second type of selection line is shown between terminals $Y_2$ and $Y'_2$. Selection line 304 is connected between these terminals and passes through magnetic elements $C_{12}$, $C_{22}$, $C_{32}$, $C'_{32}$, $C'_{22}$, and $C'_{12}$. A current in selection line 304 must always be of a value so as to "half select" an element and should flow from terminal $Y_2$ to terminal $Y'_2$. Because of the way selection line 304 is wired and assuming that the appropriate bias current passing through each element is in a direction opposite to the current shown at terminal $Y_2$, a current flowing in selection line 304 will cause a half selection of magnetic elements $C_{12}$, $C_{22}$, $C_{32}$, $C'_{32}$$C'_{22}$ and $C'_{12}$ assuming the bias current passes through each magnetic element opposite to the current on selection line 304. The remaining half select current must be provided by the encoded signals on the X selection lines, namely selection lines 301, 302, and 303.

Assuming that selection lines 301 and 304 are activated, only magnetic elements $C_{12}$ or $C'_{12}$ have the possibility of switching since these are the only elements in the array shown in FIG. 3 in which two half-select currents are flowing therethrough. If a current is flowing in selection line 301 in the direction shown at input terminal $X_1$ and a current is flowing in selection line 304 in the direction of the arrow shown at terminal $Y_2$, half-selection currents are flowing through magnetic element $C_{12}$ in the same direction, and thus under the assumed inputs, will be the only element in the array shown which will switch.

It should be noted that the magnetic elements shown in FIG. 3 represent nine associated pairs of magnetic elements and that in order to produce a usable switching array, it is necessary to add more associated pairs of magnetic elements with the associated increase in X and Y driving lines. The X lines are typically driven in combinations like those explained in relation to FIGS. 2*a*–2*e*, while the Y lines, when selected, provide half-select currents to all magnetic elements wired thereon.

Referring now to FIG. 6, a cross section of a three-dimensional array, omitting the output lines, is shown. The apparatus in FIG. 6 could also be a two-dimensional array. For ease of construction, magnetic elements 601, 602, 603 and 604 are typical examples and are plated on a single insulating type substrate. Magnetic elements 605, 606, 607 and 608 are plated on a second substrate. Selection line 611 is drawn so as to pass through magnetic elements 601, 602, 603 and 604 in the same direction relative to the bias current $I_B$ in bias line 610, which passes through all magnetic elements shown in the cross section. Several Y selection lines are shown between terminals $Y_1$–$Y'_1$, $Y_2$–$Y'_2$, $Y_3$–$Y'_3$ and $Y_4$–$Y'_4$. Only one of the Y selection lines can be activated at any one time, and these lines are selected by normal decoding techniques in external circuitry. The current in the Y selection lines is in the direction shown next to the input terminals $Y_1$, $Y_2$, $Y_3$ and $Y_4$. The current amounts to a half-selection current and thus will make it possible for eight out of the 32 magnetic elements shown to be switched in accordance with the combinations possible represented at the X inputs labeled as A, B, C and D. When the input lines are driven in accordance with circuitry of the type shown in FIG. 1*d*, only four of the thirty-two magnetic elements shown in FIG. 6 will switch at any one time. Then, if output wires are passing through the elements that are switching in accordance with the wiring patterns shown in FIGS. 2*b*–2*e*, only one of the output wires will be activated in accordance with one of the predetermined sequences of control signals entering the lines labeled A, B, C and D.

Another possible wiring is readily obvious from the discussion of the operation in FIG. 6 and other figures. This additional method of wiring would employ a plurality of bias lines, Note: FIG. 6 also could represent a 2D array. Only two selection coordinates are shown, namely, one of the X inputs (A, B, C, D) and the Y inputs ($Y_1$, $Y_2$, $Y_3$ and $Y_4$).

where each bias line would pass through the same magnetic elements as do the wires between the Y and the associated Y' terminals. In normal operation, a first output current state $I_B$ would pass from the Y' input to the Y in the direction as is shown for the bias line 610. However, when a given Y line is selected, the bias current would then be dropped to a second output current state having a value such that a "half-select" current on another selection line passing through the magnetic element would cause the magnetic element to switch to produce an induced voltage in an output line.

Another possible way to create the coincidence of half-select current at the desired magnetic elements would be to wire the magnetic elements in the X direction as shown in FIG. 3 and wire the elements in the Y direction in the same manner. At the same time, the X selection lines to associated pairs of wires would be driven in the exact same pattern as the Y selection lines, thus causing the half-select currents to be coincident only at the elements that are desired to be switched. This approach has the advantage of decreasing the noise sensitivity, but has the disadvantage of increasing the number of drivers and encoding circuitry required to create the necessary coincidence occurrence, however advantage of subtracting the column amount of electronic positive.

Figure 7B:
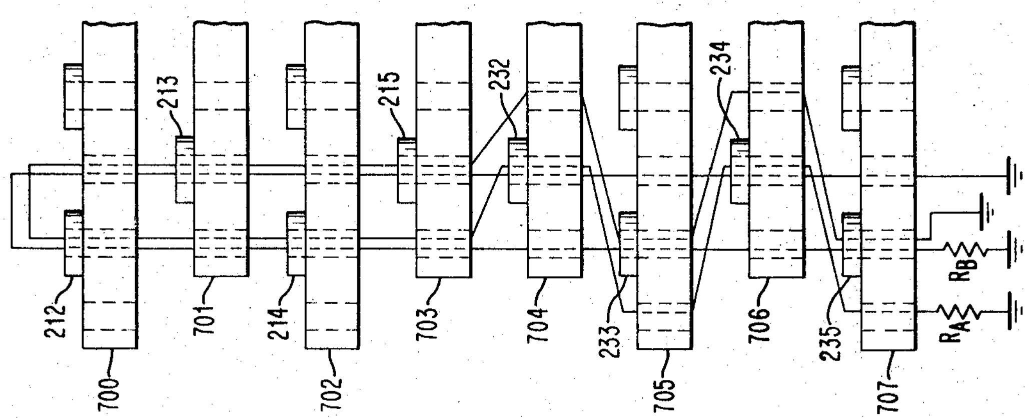
Figure 7A:
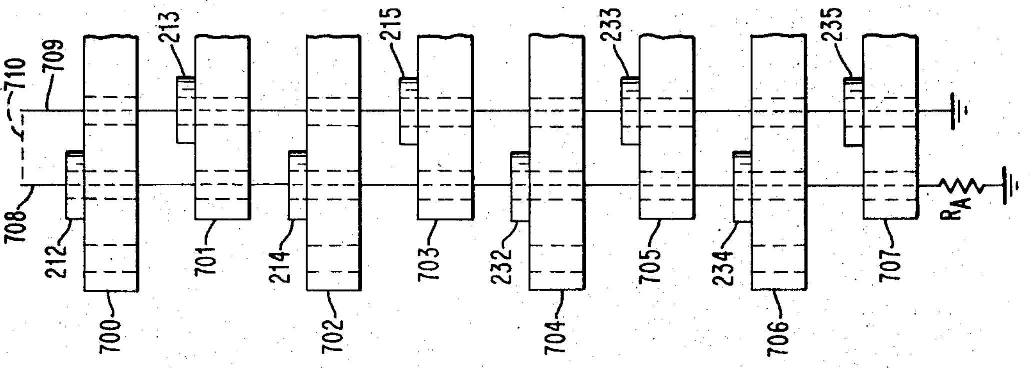

In order to understand the ease with which the various output lines (not shown in FIG. 6) can be threaded through the magnetic elements used in the present switching device, attention is directed to FIG. 7*a*. In FIG. 7*a*, there are a number of substrates 700, 701, 702, 703, 704, 705, 706 and 707 upon which magnetic materials have been deposited in the shape of elements and could be troidal elements, troidal films or films operated in the parallel-field switching mode. In fact, magnetic elements 212, 213, 214, 215, 232, 233, 234 and 235 are shown in the same relationship as they appear in FIG. 2*b*. In order to wire output line 240 shown in FIG. 2*b*, the substrates are aligned as shown in FIG. 7*a*. Then, straight wire 708 is passed through all of the substrates. In doing so, wire 708 passes through magnetic elements 212, 214, 232 and 234. A second straight line 709 is passed through all of the substrates through a different column of holes and passes through magnetic elements 213, 215, 233 and 235. It should be noted that where a straight line passes through a substrate where there is not deposited a magnetic element, the effect as far as the straight line is concerned is the same as passing through air. To complete the manufacture of sense line 240 it is necessary to ground one end of line 709 as shown, and attach resistor $R_A$ to line 708. It then remains to connect line 708 to line 709 as represented by dotted line 710. Comparing, then, the configurations shown in FIGS. 7*a* and 2*b*, it will be noted that line 708 and 709 in conjunction with dotted line 710 effectively comprise the output line 240 shown in FIG. 2*b*.

In order to fabricate a second sense line, a selected set of substrates are moved in the horizontal direction so as to align a different set of holes in vertical channels. In FIG. 7*b*, substrates 704 and 706 have been moved to the right as compared to their position shown in FIG. 7*a*, and substrates 705 and 707 have been moved to the left in comparison to their position as shown in FIG. 7*a*. A second output line is then constructed in the same manner as was described in relation to FIG. 7*a*. In fact, output line 241 with its associated load resistor $R_B$ is shown in FIG. 7*b* and passes through in the identical fashion the same magnetic elements as does sense line 241 shown in FIG. 2*c*.

In order to complete the manufacture of the output lines shown in FIGS. 2*b* and 2*c*, the substrates as shown in FIG. 7*b* merely have to be repositioned such that the additional sense lines can be easily threaded through the straight channels resulting after the repositioning of the substrates.

The required selection lines for the magnetic elements have not been shown in FIGS. 7*a* and 7*b* so as to simplify the drawings. Since some of the wires are designed to pass through the magnetic elements in a given row upon a planar substrate, these wires can be plated upon the substrates and can be designed to pass through the appropriate magnetic elements in the proper direction. Line 610 as shown in FIG. 6 is an example of a possible plated wire which could be laid down upon any one of the substrates shown in FIG. 7. In order to wire the Y selection lines as shown in FIG. 6, it is clear that techniques similar to those for wiring the sense lines as discussed in relation to FIGS. 7*a* and 7*b* will be appropriate.

Throughout this patent application, reference has been made to magnetic switching circuits of the type shown in FIG. 2*a*, wherein there are only four possible output lines as demonstrated in FIGS. 2*b*, 2*c*, 2*d* and 2*e*. However, it should be perfectly clear to those of skill in the art that by adding more associated pairs of magnetic elements as well as more selection lines, the number of unique input control signal combinations can be increased, and, consequently, more output lines can be wired through the magnetic elements which will respond to the additional unique control signal combinations. For example, eight pairs of associated elements could be constructed to respond to eight pairs of selection lines so as to produce the switching of eight unique combinations of magnetic elements which are appropriately sensible by one of eight uniquely wired sense lines.

Figure 8:
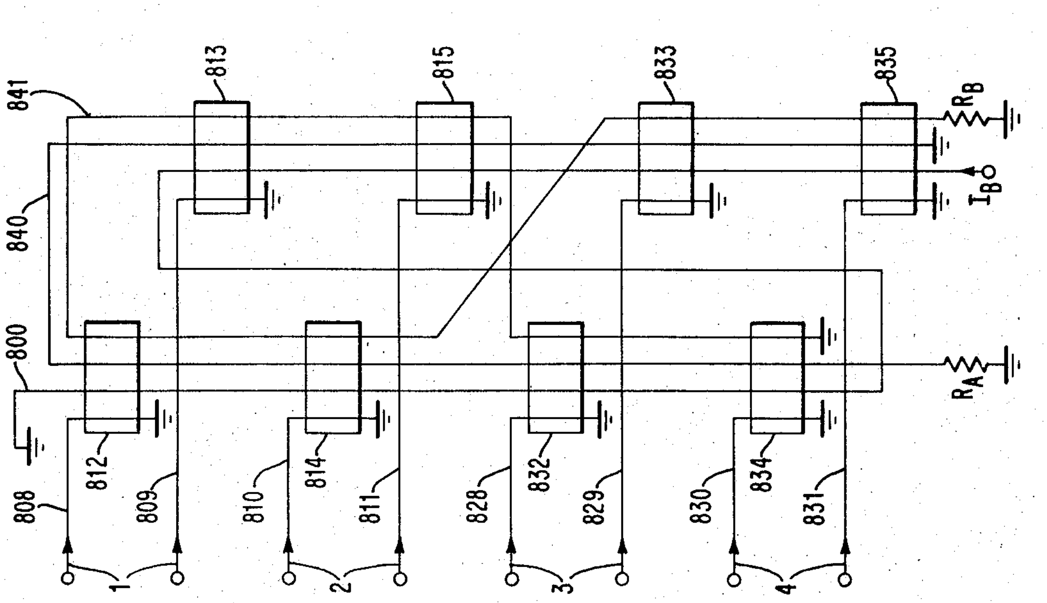

FIG. 8 shows another preferred embodiment of the present invention. This embodiment employs magnetic film spots deposited upon a substrate which is not shown in FIG. 8. Magnetic film spots 812, 813, 814, 815, 832, 833, 834, and 835 are shown in FIG. 8, each having some plated wires passing over the top of the particular magnetic film spot.

Input selection lines 808, 809, 810, 811, 828, 829, 830 and 831 are arranged essentially in the same manner as are the input selection lines shown in FIG. 2*a*. Each of the input selection lines passes over an associated magnetic film spot.

Bias line 800 is shown carrying a current $I_B$ in the direction of the arrow shown. This applied bias is used to insure that the orientation of the magnetization vector within the magnetic film spot will always be in a predetermined orientation before the decoder is activated.

A current flowing in selection 808 in the direction of the arrow as shown in FIG. 8 will cause the magnetization vector within magnetic film spot 812 to change orientation if the current in the selection line is of a sufficient magnitude to overcome the effects of the biasing current $I_B$. The same analysis would be true for any of the other selection lines shown in FIG. 8. It will also be recognized from the previous analysis that input selection lines could constitute a plurality of selection lines where the current in any one selection line is insufficient to switch the magnetization vector within a given film spot but in combination would be sufficient to change the magnetization vector. Thus, input selection line 808 could be replaced by, for example, two input selection lines. If the current in those two replacing selection lines were of a sufficient magnitude, the magnitization vector of film spot 812 could be switched. These current values could also be adjusted such that if only one input selection line were active, the magnetization vector of film spot 812 would not switch.

It would also be noted that the bias line 800 could be replaced by a bias current in a second selection line which would have a configuration similar to selection line 304 shown in FIG. 3. The current passing through this selection line would be of a sufficient magnitude to always bias all the film spots sufficiently so that a current in any one of the other selection lines for a given magnetic film spot would be insufficient to switch the magnetization vector. In order to cause the switching of a given film spot, it would be necessary to reduce the bias current in the second selection line and simultaneously apply a current in the first selection line. Thus, the driving characteristics of the magnetic film spot embodiment shown in FIG. 8 are essentially the same as the characteristics of the other embodiments heretofore discussed.

Output line 840 is shown being plated over all of the magnetic film spots shown in FIG. 8. In fact, the configuration of output line 840 is identical to the configuration of output line 240 shown in FIG. 2*b*. Assuming that input lines 808, 810, 828 and 830 were activated so as to switch magnetic film spots 812, 814, 832 and 834, a voltage contribution due to the switching of each of the magnetic film spots would occur and these contributions would add up in output line 840 so as to cause a voltage to appear across output load resistor $R_A$. Thus, the configuration shown in FIG. 8 in relation to output line 840 is identical to the configuration shown in FIGS. 2a and 2b with respect to output line 240.

A similar analysis equally applied to output line 841, which is wired in the same physical configuration with regards to FIG. 8 as output line 241 is wired considering the configuration in FIG. 2c.

The advantages of the embodiment portrayed in FIG. 8 are quite clear. It is, in the first place, an advantageous configuration because the wiring required can be easily generated through further graphic depositing techniques which have become very well known in the transistor and miniature circuit fabrication arts. It is also advantageous, in the second place, because the output lines from the decoder can be plated across the supporting substrate to the circuitry which would utilize the various output lines such as a magnetic memory where the output lines correspond to half-select lines in the memory.

While the invention has been particularly shown and described with reference to certain preferred embodiments thereof, it will be understood by those skilled in the art that the foregoing and other changes in form and details may be made therein without departing from the spirit and scope of this invention.

What is claimed is:

1. A magnetic element switching device comprising:
a plurality of magnetic elements each biased to a common stable point on its B-H characteristic curve;
a plurality of selection wires, each selection wire associated with two of said plurality of magnetic elements, each of said selection wires being arranged so as to switch one of said associated magnetic elements when a current flows thereon in one direction and arranged to switch the other magnetic element when a current flows thereon in the opposite direction;
a plurality of driver means, each driver means being connected to a single selection wire and operative to generate a signal in response to external control signals. said generated signal being capable of switching either magnetic elements associated with the connected selection wire;
a plurality of output wires, each output wire being arranged to receive a signal from each switching magnetic element and for each combination of each external signal only one of said output wires will receive complimentary signals from the switching of each magnetic element.

2. A magnetic switching circuit comprising:
a plurality of switching cells each having a pair of magnetic elements made of material exhibiting a substantially rectangular hysteresis characteristic and different stable states of flux remanence including a datum stable state;
control means coupled to said cells and responsive to information control signals to switch only one of said magnetic elements from its datum state toward a different stable state in accordance with said information control signals;
means operative after operation of said control means to switch all of said magnetic elements of each cell to the datum stable state; and,
a plurality of output lines each coupling all of said elements in accordance with a predetermined combinatorial code such that a net output voltage is manifested on only one of said output lines upon switching of said magnetic elements.

3. The magnetic switch of claim 2, wherein said means for switching all of said magnetic elements of each cell to the datum stable state comprises means for biasing all of said elements in the datum stable state.

4. A device for decoding combinations of bivalued input signals into unique output signals comprising:
at least one set of magnetic switch elements, each element having a normal stable state and capable of being switched to a different state in response to an applied excitation exceeding a predetermined threshold level;
input lines on which bivalued input signals can be placed in various selected combinations, at least some of which cause excitations exceeding said threshold level to be applied selectively to various combinations of said switch elements according to the input signal combinations that are being decoded;
and output lines on which signals are selectively manifested according to the manner in which said elements are switched by the input signals, there being a plurality of output lines for each set of switch elements, and each of said output lines being arranged to receive a contributory signal of one polarity or the other from each element in its set that switches from a normal stable state to a different state, the arrangement being such that each output line manifests an output signal of predetermined magnitude in response to the switching of a unique combination of elements.

5. A decoding device as set forth in claim 4 wherein said input lines are arranged in pairs, one pair for each bivalued input signal that may be applied to said device; the input lines of each pair being selectively energizable according to the value of the respective input signal; each input line, when energized applying excitation to a respective one of the switch elements in each set thereof; whereby half of the switch elements in each set will be switched only in response to input signals of one particular value exceeding the threshold level, while the other half of the elements in that set will be switched only in response to input signals of the other value exceeding the threshold level.

6. A decoding device as set forth in claim 4 wherein each of said output lines is so arranged that the contributory signals which it receives from the switched elements in its set will assume a mutually aiding relationship only in response to a unique combination of input signal values.

7. A magnetic switching device comprising:
a plurality of magnetic elements divided into sets where each set has an even number of magnetic elements;
a plurality of bias wires, each being associated with a single set of elements and arranged such that a current flowing therein can bias each magnetic element to a common stable point on its B-H characteristic curve;
a first set of external control signals;
a plurality of bias current drivers each connected to a single bias wire and having a first and second output current state being of the proper magnitude and direction so as to prevent any magnetic element associated with the connected bias wire from switching when said bias current source is in either said first output current state or said second output current state, said bias current source responsive to said first external control signals for controlling the output current state of said bias current driver;
a second set of control signals;
a plurality of selection means responsive to said second set of control signals, each switching means being associated with two magnetic elements of each set of elements and operative to switch one magnetic element in each associated pair of magnetic elements when said bias current driver is operating in said second output current state, said selection means inoperative to switch one magnetic element in each associated pair of magnetic elements when said bias current source is in that first output current state; and,
a plurality of output wires for each set of magnetic elements, each output wire being arranged to receive a signal from each switching magnetic element within a set of magnetic elements and for each combination of control signals only one of said output wires will receive complimentary signals from the switching of each magnetic element.

8. A decoding apparatus for decoding combinations of input signals into discrete output signals comprising:

at least one pair of magnetic switching elements, each element having a nonlinear magnetic characteristic with two signal states and capable of being switched from one state to another in response to an applied excitation signal having a magnitude greater than a given threshold value;

an input signal means for each pair of magnetic switching elements for carrying said excitation signal to switch one of said magnetic switching elements in each pair of magnetic switching elements;

and a plurality of output means, each output means receiving a signal due to the switching of each of said magnetic switching elements, the contribution of signals from each magnetic switching element switch being complimentary upon only one of said output means for each combination of applied excitation signals.

9. An apparatus for decoding combinations of input signals into discrete output signals comprising:

at least one pair of magnetic switching elements, each element having a nonlinear magnetic characteristic with two saturation states and capable of being switched from one saturation state to another;

a bias means for maintaining each of said magnetic switching elements in one of said saturation states;

an input signal means for each pair of magnetic switching elements for carrying an excitation signal having a given threshold value so as to switch one of said magnetic switching elements in each pair of magnetic switching elements; and a plurality of output means, each output means receiving a signal due to the switching of each of said magnetic switching elements, the contribution of signals from each magnetic switching element switch being complimentary upon only one of said output means for each combination of applied excitation signals.

* * * * *